United States Patent
Baur

(10) Patent No.: US 9,959,655 B2
(45) Date of Patent: May 1, 2018

(54) SEGMENTED FULL BODY INVERSE KINEMATICS

(71) Applicant: Autodesk, Inc., San Rafael, CA (US)

(72) Inventor: Alain Baur, Antony (FR)

(73) Assignee: Autodesk, Inc., San Rafael, CA (US)

( * ) Notice: Subject to any disclaimer, the term of this patent is extended or adjusted under 35 U.S.C. 154(b) by 57 days.

(21) Appl. No.: 15/130,722

(22) Filed: Apr. 15, 2016

(65) Prior Publication Data

US 2016/0307354 A1  Oct. 20, 2016

Related U.S. Application Data

(62) Division of application No. 62/149,106, filed on Apr. 17, 2015.

(51) Int. Cl.
*G06T 13/40* (2011.01)
*G06T 15/00* (2011.01)

(52) U.S. Cl.
CPC .................... *G06T 13/40* (2013.01)

(58) Field of Classification Search
None
See application file for complete search history.

(56) References Cited

U.S. PATENT DOCUMENTS

| | | | | |
|---|---|---|---|---|
| 5,889,532 A * | 3/1999 | Boucher | ................. | G06T 13/40 345/473 |
| 6,191,798 B1 * | 2/2001 | Handelman | ............. | G06T 13/40 345/473 |
| 6,400,368 B1 * | 6/2002 | Laperriere | .............. | G06T 13/40 345/420 |
| 7,035,436 B2 * | 4/2006 | Nakamura | .............. | G06T 13/40 348/155 |
| 7,106,334 B2 * | 9/2006 | Imagawa | ................ | G06T 13/40 345/474 |
| 2004/0012594 A1 * | 1/2004 | Gauthier | ................. | G06T 13/40 345/473 |
| 2004/0263518 A1 * | 12/2004 | Anderson | ............... | G06T 13/40 345/473 |
| 2005/0001842 A1 * | 1/2005 | Park | ........................ | G06T 13/40 345/474 |
| 2006/0250402 A1 * | 11/2006 | Perlin | ..................... | G06T 13/40 345/474 |

(Continued)

OTHER PUBLICATIONS

"HumanIK User Manual", Autodesk, 2016.

(Continued)

*Primary Examiner* — Barry Drennan
*Assistant Examiner* — Jason Pringle-Parker
(74) *Attorney, Agent, or Firm* — Gates & Cooper LLP

(57) ABSTRACT

A method, system, and computer program product provide the ability to render an animated creature in real-time. A creature diagram for a creature, having chains sections, is drawn. An effector is created for each section and each chain, and defines a target position and an orientation that is reached. A chain solving type is selected for the chains, and is used to simulate a desired biomechanical behavior of the creature. The creature diagram, including the sections, chains, and chain solving types, is mapped to a three-dimensional (3D) model. The creature is animated/rendered in a real-time 3D application based on the mapping.

23 Claims, 8 Drawing Sheets

(56) References Cited

U.S. PATENT DOCUMENTS

2010/0030532 A1* 2/2010 Arora ................... G06T 13/40
703/2
2011/0267358 A1* 11/2011 Rennuit ................. G06T 13/40
345/474
2014/0334670 A1* 11/2014 Guigues ................ G06T 7/251
382/103

OTHER PUBLICATIONS

"Root-Motion", RootMotion, Feb. 13, 2017. http://root-motion.com.
"Ikinema", Ikinema Limited, Feb. 13, 2017. http://ikinema.com.

* cited by examiner

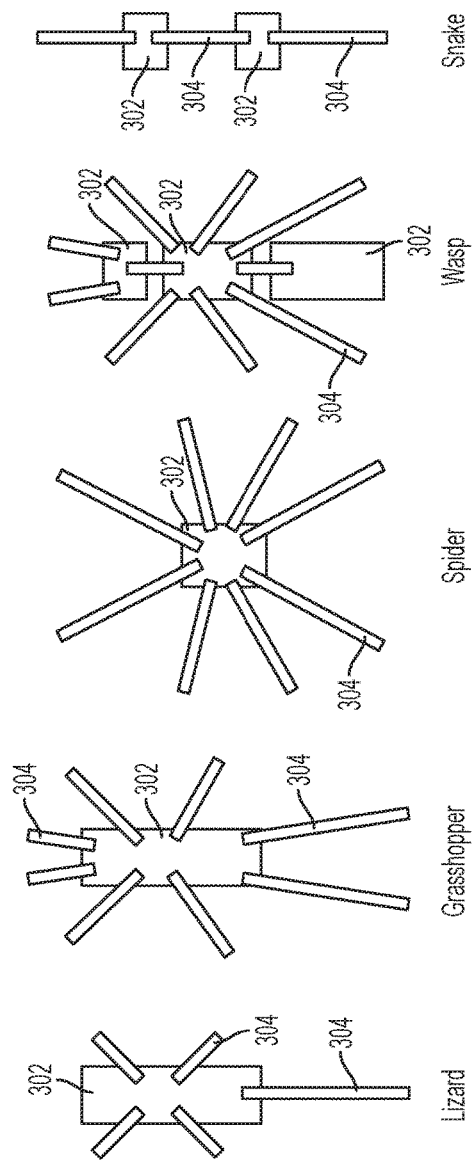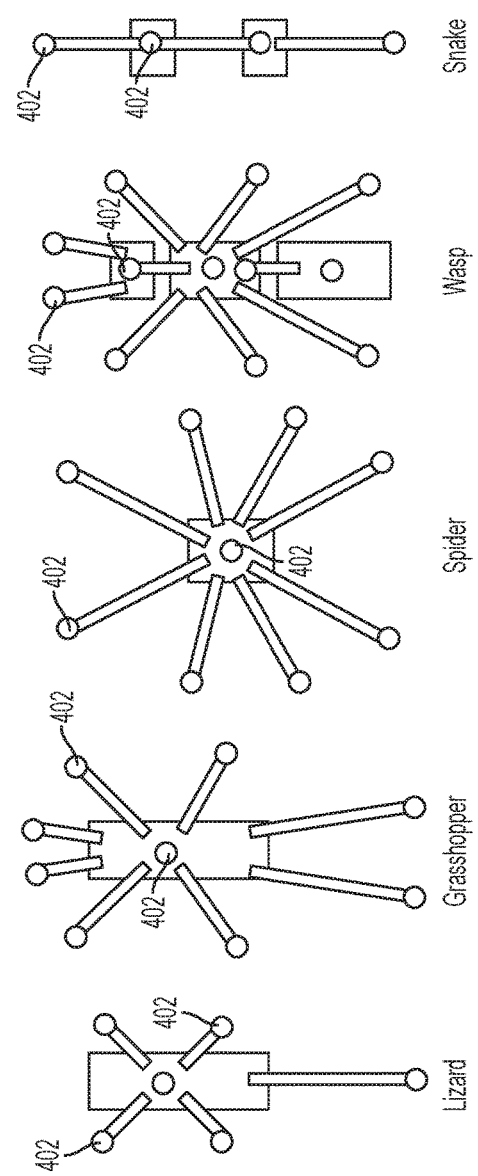
FIG. 3
FIG. 4

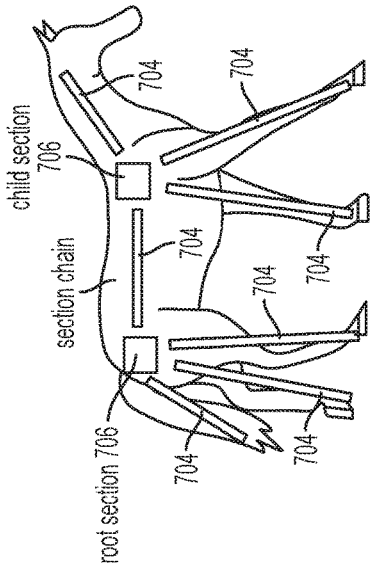

FIG. 7A

3D Skeletal model (joints in red)

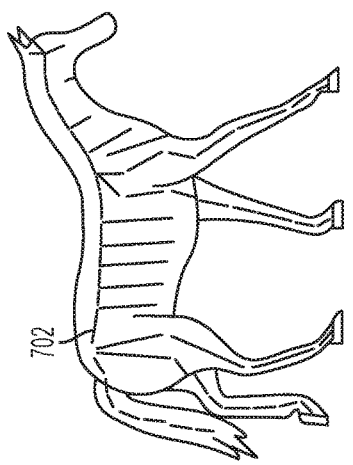

FIG. 7B

| HIKCreature |
|---|
| Nodes Count |
| Sections Count |
| Chains Count |
| Sections Definitions[...] |
| Chains Definitions[...] |
| Reference Pose[...] |
| Parenting Data[...] |
| Joint Limits[...] |
| Parent Offsets[...] |

| HIKCreatureState |
|---|
| Chain 0, Node 0: TxTyTz QxQyQzQw SxSySz |
| Chain 0, Node 1: TxTyTz QxQyQzQw SxSySz |
| Chain 0, Node 2: TxTyTz QxQyQzQw SxSySz |
| Chain 1, Node 0: TxTyTz QxQyQzQw SxSySz |
| Chain 1, Node 1: TxTyTz QxQyQzQw SxSySz |
| Chain 1, Node 2: TxTyTz QxQyQzQw SxSySz |
| Section 0 : TxTyTz QxQyQzQw SxSySz |
| Section 1 : TxTyTz QxQyQzQw SxSySz |

| HIKEffectorSetState | |
|---|---|
| Chain 0 | : TxTyTz QxQyQzQw SxSySz |
| Chain 1 | : TxTyTz QxQyQzQw SxSySz |
| Section 0 | : TxTyTz QxQyQzQw SxSySz |
| Section 1 | : TxTyTz QxQyQzQw SxSySz |
| Section 0 WA | : TxTyTz QxQyQzQw SxSySz |
| Section 1 WA | : TxTyTz QxQyQzQw SxSySz |
| Section 0 WB | : TxTyTz QxQyQzQw SxSySz |
| Section 1 WB | : TxTyTz QxQyQzQw SxSySz |

FIG. 8

SEGMENTED FULL BODY INVERSE KINEMATICS

CROSS-REFERENCE TO RELATED APPLICATIONS

This application claims the benefit under 35 U.S.C. Section 119(e) of the following commonly-assigned U.S. provisional patent application(s), which is/are incorporated by reference herein:

Provisional Application Ser. No. 62/149,106, filed on Apr. 17, 2015, with inventor(s) Alain Baur, entitled "Segmented Full Body Inverse Kinematics,".

BACKGROUND OF THE INVENTION

1. Field of the Invention

The present invention relates generally to computer generated animation, and in particular, to a method, apparatus, and article of manufacture for controlling/generating the animation of a 3D skeletal mesh in real time using kinematic constraints.

2. Description of the Related Art

When creating video games, movies, television shows, etc. that contain animation, it is desirable to animate characters and/or skeletons that have different joints/bones. Prior art systems require animators to animate each joint/bone one-by-one for every frame. Thus, with approximately 24 frames per second, the number of animations required is voluminous. Further, with video games, the animation is actually rendered/displayed as the game player is moving a character/playing the game in real time. Accordingly, prior art systems require the animator to predict/account for an almost unlimited number of situations that will occur (e.g., in a game) (i.e., to account for the different animations that will be required). What is needed is the ability to specify the type of motion to be automatically generated on a character without specifying individual transformations for all separated joints, in a manner that provides an organic appearance, is customizable, easy to control, and can be performed in real-time. In general, the prior art fails to solve the problem of applying a set of weighted inverse kinematics constraints globally to a three-dimensional (3D) skeletal mesh to easily control (or generate) its animation in real time.

To better understand the problems and deficiencies of the prior art, a brief description of the HUMANIK™ CHARACTER SOLVER, CAT™, IKINEMA™, and FINALIK™ products may be useful.

One prior art system (e.g., the HUMANIK™ CHARACTER SOLVER that is part of the MOTIONBUILDER™ and MAYA™ applications) only works on humanoid skeletal meshes and does not support extensive customization, and requires an extensive and difficult setup. Alternative prior art inverse kinematic solvers (e.g., the CAT™ application) may partially solve the problems identified above but fail to provide a real-time solution.

The prior art IKINEMA™ product provides a full body inverse kinematics solver that is able to partially solve the problems identified above. However, the IKINEMA™ product is hard to control, slow to process (global optimization problem), and the resulting animation does not look organic. Further, tuning the IKINEMA™ product is difficult. In addition, the IKINEMA™ product requires a user to manually build a creature (e.g., a character or skeleton) using a single base level component that is repeated as many times as is required followed by the manual configuration of properties to the same component in order to define a desired behavior. Such a process is slow, confusing, and requires a substantial user knowledge base. In this regard, utilizing low-level semantics and the same component with different properties to define and simulate the relationships between different components is processor/CPU expensive compared to that of embodiments of the present invention.

The prior art FINALIK™ product provides a full body inverse kinematics solver that is also able to partially solve the problems identified above. However, the FINALIK™ product provides limited functionality and cannot handle any skeletal mesh hierarchy.

SUMMARY OF THE INVENTION

Embodiments of the invention solve the problem of applying a set of weighted inverse kinematics constraints globally to a 3D skeletal mesh (e.g., a human, an animal, an insect, an imaginary creature, etc.) to easily control (or generate) its animation in real time. Attributes of embodiments of the invention include global application of constraints, easy control, and real-time application of constraints.

Embodiments of the invention apply the constraints globally by solving all inverse kinematics constraints continuously (the skeletal mesh is considered as a whole), thereby enabling a very natural/organic looking animation.

Embodiments of the invention easily control animation by providing tools that enable a user with a minimal skill level to set up and operate the system, sparing hours of artist working time.

Embodiments of the invention provide real-time capability via a solver that uses an original approach that makes it possible to apply the inverse kinematics constraints in fractions of milliseconds, thus making it possible to operate in real-time environments (e.g., interactive applications, video games, mobile apps, etc.).

BRIEF DESCRIPTION OF THE DRAWINGS

Referring now to the drawings in which like reference numbers represent corresponding parts throughout:

FIG. 3 illustrates exemplary sample creatures that may be drawn in accordance with one or more embodiments of the invention;

FIG. 4 shows the Effectors (illustrates as small circles/dots) that are automatically created to control the animation for the sample creatures of FIG. 3 in accordance with one or more embodiments of the invention;

FIGS. 7A and 7B illustrate one way of mapping the 3D skeletal model of a horse in accordance with one or more embodiments of the invention;

FIG. 8 illustrates examples of three exemplary structures created by the solver during the setup phase in accordance with one or more embodiments of the invention;

DETAILED DESCRIPTION OF THE PREFERRED EMBODIMENTS

Figure 1:
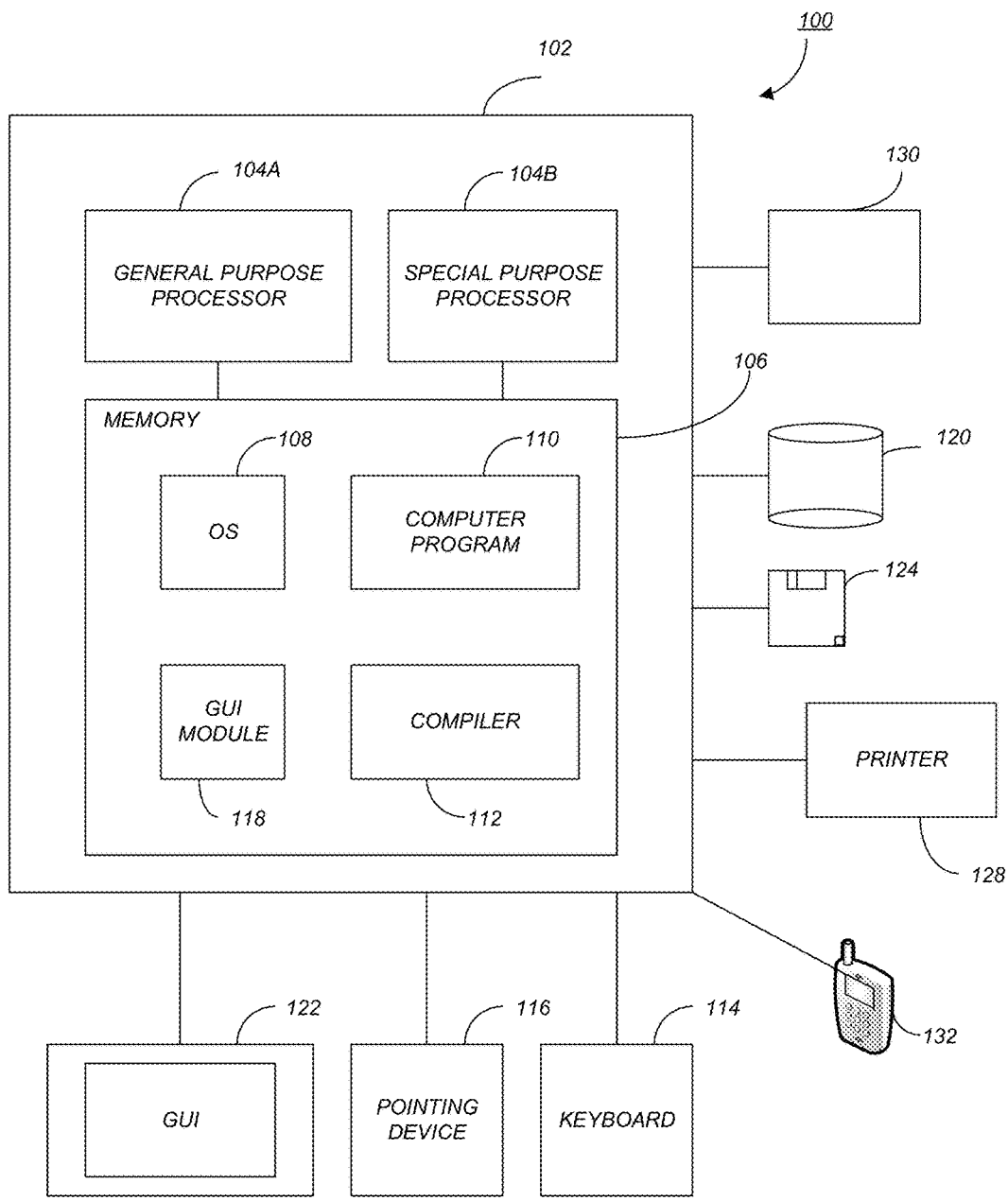
FIG. 1 is an exemplary hardware and software environment used to implement one or more embodiments of the invention.

In the following description, reference is made to the accompanying drawings which form a part hereof, and which is shown, by way of illustration, several embodiments of the present invention. It is understood that other embodiments may be utilized and structural changes may be made without departing from the scope of the present invention.

Overview

Embodiments of the invention apply a set of weighted inverse kinematics constraints globally to a 3D skeletal mesh to easily control a creature's animation in real time. Such capabilities are provided using a system referred to as a "solver" (also referred to as a "CREATURE SOLVER"). The solver receives three input data (A, B, C), and produces one output data (D).

The first input data (A) describes the skeletal mesh high-level construction plan (inverse kinematics chains and sections).

The second input data (B) is a skeletal pose: a list of initial locations and orientations for each individual skeletal mesh joint.

The third input data (C) is a set of weighted constraints to apply on (B) in accordance with (A) to produce output data (D).

Output data (D) is a skeletal pose: a list of final locations and orientations for each individual skeletal mesh joint compliant with (A), preserving as much transformation data as possible from (B) while fulfilling all constraints listed in (C) using inverse kinematics.

Embodiments of the invention use the construction plan (A) to define a segmented sequential solving sequence. This segmentation is key from a performance perspective. In this regard, it may not be possible to reach good enough real-time performances without this segmentation. Further, without the segmentation, this problem would be a global optimization problem requiring CPU (central processing unit) expensive solutions. Further, this segmentation does not produce visual discontinuities because each segment is taking into account an approximation of the effect of all other segments in the solving sequence. Such a mechanism, called energy transfer, is key from an animation quality perspective. It may not be possible to reach organic looking quality without this subtle energy transfer. This inter-section energy transfer may be the most complex part of embodiments of the invention. This segmentation also makes the system easy to operate since the user can separately tune each skeletal mesh part (e.g., limbs, appendages, etc.).

In view of the above, embodiments of the invention provide a far more generic/flexible approach than the prior art that was hardcoded for humans. In this regard, some prior art systems (e.g., the CHARACTER SOLVER™ application within the HUMANIK™ application available from the assignee of the present application) was limited to four limbs, two arms and two legs and could not be extended to handle extra appendages. Further, modifying the solution in such a prior art system to handle something else than humans was, by nature, impossible. Accordingly, the HUMANIK™ application was mostly useless for game and movie customers working on non-humanoid characters. Embodiments of the invention (referred to herein as the CREATURE SOLVER™ tool/application) add, among other things, is some sort of high-level "Construction Plan" that provides the user with a way to define its own skeleton topology. This extra layer enables the user to connect any number of legs, arms, antennae, spines, etc. to a skeleton.

The CREATURE SOLVER™ tool itself is able to process this "Construction Plan" and smoothly solve complex full body inverse kinematics (IK) problems. Accordingly, one new aspect of the solver of embodiment of the invention, is that the solver may be data driven (with the "Construction Plan"), not hard coded (with human biomechanical properties). Such a solution solves quite differently for creatures since it has to decompose the "Construction Plan" into a sequence of solving steps instead of taking advantage of built-in knowledge.

Further to the above, embodiments of the invention utilize less steps, especially when it comes to setting up the solver. Customers using prior art systems often complained about the "T-Stance" requirement that prior art products imposed for setting up the solver. This "T-Stance" requirement forced the artist to modify its skeletal asset in order to match a very unnatural pose where all limbs had to be axis aligned. Such a prior art requirement was error prone, subjective and required time consuming operations. In contrast, embodiments of the present invention no longer have such a requirement while also providing the ability to "understand" a natural/normal pose. In this regard, folding angles for all limbs are automatically deduced from that natural pose and/or extrapolated. Accordingly, the artist is now able to use its skeleton "as is" to set up the solver, which constitutes a substantial workflow simplification compared to that of the prior art.

In addition to the above, embodiments of the invention provide flexibility when defining a torque setting to a segment. In this regard, a user can define an individual stiffness for each segment (e.g., Chain (leg, arm, spine, etc.)). This stiffness defines resistance to both pull (translation) and torque (rotation). Such capability enables the user to control an individual chain's flexibility.

Accordingly, embodiments of the invention allow any non-expert to create beautiful and realistic animations with minimal effort in just a few minutes without sacrificing real-time performance. There is no other existing prior art method for achieving such results in such an intuitive way.

Hardware Environment

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, IPOD™, NOOK™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., IPHONE™, NEXUS S™, DROID™ devices, etc.), tablet computers (e.g., IPAD™, HP TOUCHPAD™), portable/handheld game/music/video player/console devices (e.g., IPOD TOUCH™, MP3 players, NINTENDO 3DS™, PLAYSTATION PORTABLE™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, PASCAL, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as JAVA™, PERL™, BASIC™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transitory computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
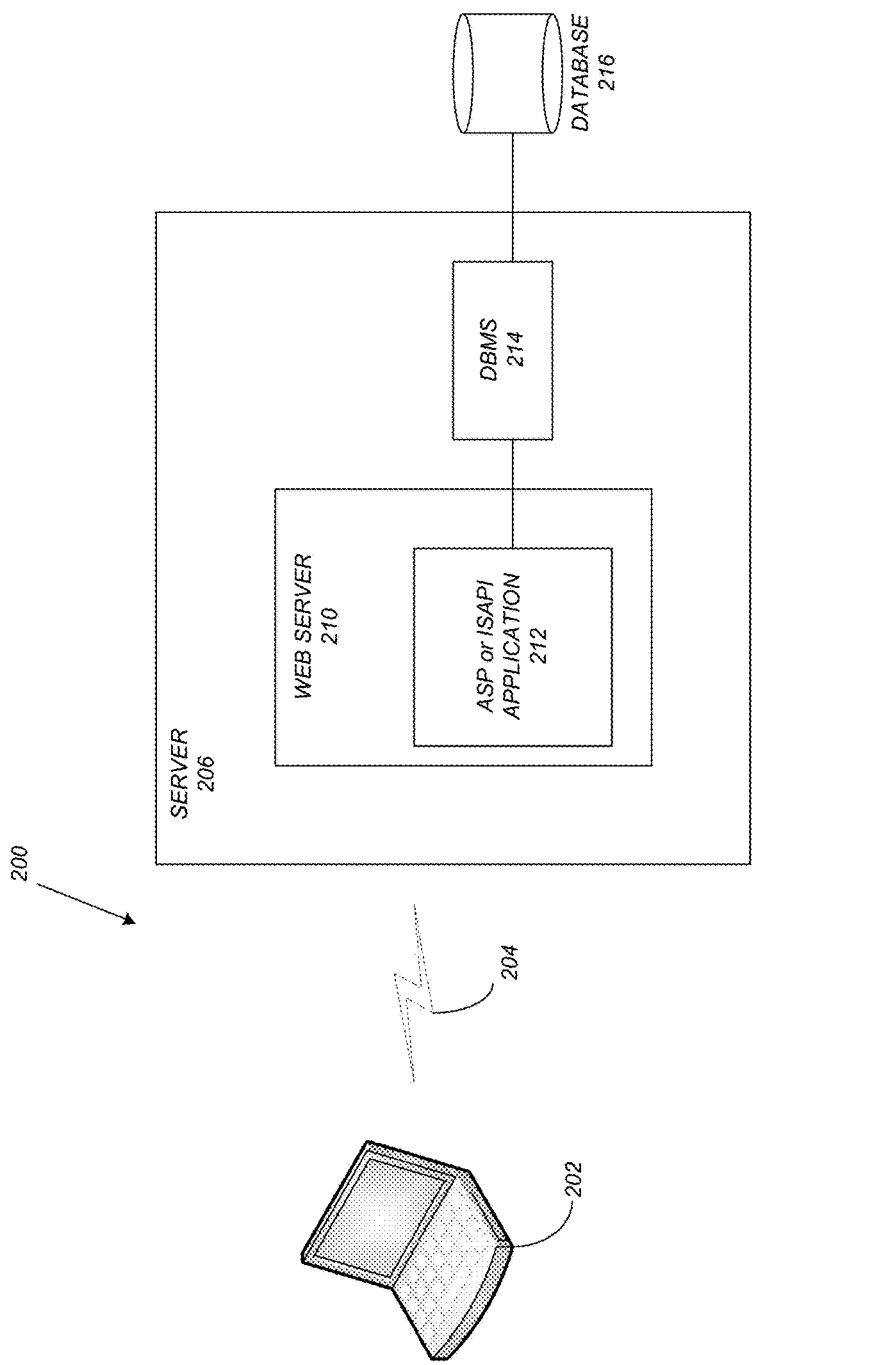
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROME™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiments—CREATURE SOLVER™ Application/Tool Overview

Embodiments of the invention are implemented as a software application on a client 202 or server computer 206. Further, as described above, the client 202 or server computer 206 may comprise a thin client device or a portable device that has a multi-touch-based display. As used herein, the software application/tool may be referred to as a solver and/or CREATURE SOLVER™.

The CREATURE SOLVER™ feature is available in HUMANIK™ (available from the assignee of the present invention) along with the CHARACTER SOLVER™ feature. Both of these solvers/solver features are complementary; CREATURE SOLVER™ is not replacing CHARACTER SOLVER™. CHARACTER SOLVER™ is used for performing inverse kinematics (IK) and retargeting on bipeds, and to some extent on quadrupeds. One can consider CHARACTER SOLVER™ to be more suited for humans. CREATURE SOLVER™ is more generic and can be used for performing IK on all other animated entities, which are not human looking such as, insects, dragons, snakes, trees, octopuses, and so on.

CREATURE SOLVER™ is built around similar concepts to that of CHARACTER SOLVER™ such as, reach, pull, resist, stiffness, and so on. If a user is familiar with the CHARACTER SOLVER™ tool, the user can easily learn the new CREATURE SOLVER™ feature/tool. The CREATURE SOLVER™ API (application programming interface) mostly matches an essential subset of the CHARACTER SOLVER™ API (prefixed with HIKCreature). If a user is new to HUMANIK™, learning CREATURE SOLVER™ will be easier than learning CHARACTER SOLVER™ because the set up phase for a creature is easier than the set up phase for a character.

One may also note that users may add or modify existing Chain solvers (explained below in "Setting up your creatures").

In view of the above and as set forth below, the following terms are useful to gain a better understanding of one or more embodiments of the invention:

Chain: A Chain is a limb (antenna, tail, tentacle, mandible, and others), or a link between two Sections such as, a neck or spine. Chains are connected to Sections.

CHARACTER SOLVER™: The IK and retargeting solver that can be used for animating human entities (bipeds), and to some extent for quadrupeds.

Characterization: The Characterization process provides HUMANIK™ with a valid construction plan for a creature (Creature Definition) including the valid Natural Pose transformation for each Chain and Section joints. Characterization only happens once at initialization time.

CREATURE SOLVER™: The IK solver that can be used for animating non-human creatures such as, insects, dragons, snakes, octopuses, trees, and so on.

Effector: An Effector defines a target position and target orientation to reach using a Chain or a Section as well as blending factors to blend between FK (forward kinematics) and IK. Both Chains and Sections in CREATURE SOLVER™ own a single Effector.

Natural Pose: A Natural Pose is required at characterization for the CREATURE SOLVER™ tool. In the natural pose, all default bending angles must be explicit (none of the Chains must be in full extension). Some Chain solver types require these explicit angles to learn how to naturally fold limbs.

Section: A Section is a central body part for a creature (chest, abdomen, thorax, and so on). Chains are attached to Sections, and they can pull Sections when FullBodyIK is enabled.

T-Stance: A valid Characterization pose for CHARACTER SOLVER™ (not for CREATURE SOLVER™ that requires a Natural Pose).

Fundamental Design Choices

The CHARACTER SOLVER™ design is centered on retargeting, whereas the CREATURE SOLVER™ design is centered on inverse kinematic (IK) solving. Retargeting is not the primary function of CREATURE SOLVER™. The IK solving centered design eliminates the mandatory T-stance/pose (i.e., a prior art character design requirement that a character must be standing upright, looking directly ahead with its arms out to the side in a "T" shaped pose [in order to provide crucial information about the proportions of a character's skeleton and its joint transforms]) and all related conversions that are imposed in CHARACTER SOLVING™, so CREATURE SOLVER™ provides better performance and is easy to use. For CREATURE SOLVER™, only a natural pose is required during characterization and coordinate conversion is not required.

The CHARACTER SOLVER™ implementation focuses on precision because this solver is a core component of the AUTODESK™ DCC™ (digital content creation) software (especially MOTIONBUILDER™). CREATURE SOLVER™ focuses more on performance and it approximates solutions instead of reaching them precisely. In most games, the importance is given to conveying the intention and not precision. For example, in a game, game developers do not care about a snake hitting its target with its tail at 0.001 meters precision, but developers want the player to understand that the snake is hitting the target.

The CREATURE SOLVER™ tool of embodiments of the invention exposes less parameters and properties than the CHARACTER SOLVER™ tool. There are no intermediary effectors such as, elbows and knees that can be tuned for approach/reach. Moreover, there is no specific floor contact code, so a user needs to set up various codes through raw Effectors positioning.

Users must remember to use the CHARACTER SOLVER™ tool and CREATURE SOLVER™ tool along with the relevant forward kinematics (FK) data. These solvers can obtain realistic looking animation only when users start from the relevant FK data. All artistic intentions and the style of a final animation depend on the input FK.

HUMANIK™ fulfills constraints for all Effectors at the same time, preserving as much as possible from original FK transforms. For example, consider that a user may want a creature to grab an object on the ground, somewhere in front of it (in a dynamic game context). If the IK solving sequence is started from an idle FK pose (standing idle), it will not produce good results. To produce good results, a generic "grab an object on the ground" animation must be created. This generic animation needs to be first applied on the creature using an FK animation engine before calling the HUMANIK™ solver that adapts this animation to the actual transform of the object to be grabbed.

Software Embodiments—Setting up a Creature

Step 1: Draw a Creature Diagram

A creature is made up of two base elements that are combined together: Chains and Sections. A Chain is a limb (antenna, tail, tentacle, mandible, and others), or a link between two Sections such as, a neck or spine. A creature with zero Sections is valid (if you only want to perform IK on its limbs, not on its entire body). Sections are central body parts. You can consider them as a junction point for several Chains. Chains can pull Sections when reaching full extension (this is known as FullBodyIK).

Embodiments of the invention automatically create one Effector for each chain that is located at the end of the Chain (there are no intermediary Effectors). This Effector defines the target position and orientation that is reached using this Chain.

Embodiments of the invention also create one Effector for each Section. This Effector defines the target position and orientation that is reached using this Section.

It is recommended to draw a diagram decomposing your creature into Chains and Sections before writing any code. FIG. 3 illustrates exemplary sample creatures that may be drawn in accordance with one or more embodiments of the invention. The exemplary samples include a lizard, a grasshopper, a spider, a wasp, and a snake. There are various sections 302 and chains 304 that are used to define each creature.

Typically, there are many different options for implementing the same creature. Depending on which part of the creature you plan to animate and how you plan to animate it, selecting one combination or another might make a difference. FIG. 4 shows the Effectors (illustrated as small circles/dots) that are automatically created to control the animation for the sample creatures of FIG. 3 in accordance with one or more embodiments of the invention. As illustrated one Effector 402 is created for each section 302/chain 304.

Step 2: Select the Type of Chains for the Creature

After drawing the diagrams, the user can choose the actual chain solving types. Depending on the type of the appendage that is being solved, quality expectations, and CPU constraints, one chain solving type may be preferred over another. The number of actual joints in a creature 3D model should not influence the type of appendage selected. Further, a user does not have to declare all skeleton joints to HUMANIK™. Instead, a user may skip some skeleton joints, which is a good practice for better performance. For example, it is valid to attach a TwoBoneIK Chain solver on a leg with five joints. Also, it is possible to change the Chain solving time on the fly such as, for implementing a LOD (level of detail) strategy. Further, a user does not need to define Chain solving types conclusively.

In view of the above, during step 1, the user acquires the diagram of the creature he/she desires to simulate/animate, and effectors are created for each chain/section. During step 2, the user selects the appropriate chain type desired in order to provide the relevant biomechanical behavior for each chain.

Figure 5:
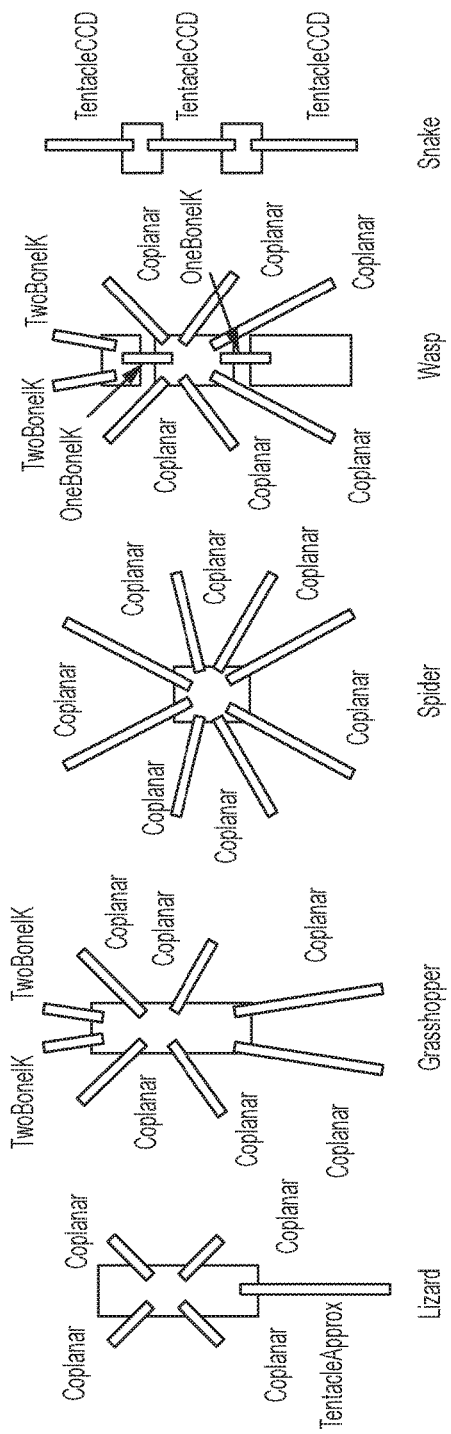
FIG. 5 shows exemplary chain solver types selected for the sample creatures of FIG. 3 in accordance with one or more embodiments of the invention.

FIG. 5 shows exemplary chain solver types that have been selected for the sample creatures of FIG. 3 in accordance with one or more embodiments of the invention. A description of five exemplary chain types are described below. Further, if the user wants to add a new chain type, embodiments of the invention may provide such capabilities/functionality.

HIKChainSolvingTypeOneBoneIK—Referred to as OneBoneIK, this is the most basic chain type. Only two joints are involved; one at the top of the chain 304 and the other at the end of the chain 304. If the Effector ReachT value is non-zero (position constraint), the solver reorients the top joint of the chain 304 so that it aims towards the end Effector 402 position. If the Effector ReachR value is non-zero (orientation constraint), the end joint reorients to the desired target orientation. This solving mode is very effective in terms of CPU usage. For example, such a chain type may be used for a Wasp tail. There are no parameters for this chain type.

HIKChainSolvingTypeTwoBonesIK—The TwoBonesIK chain type is a two bones IK solver. There are three joints involved: a top joint, a middle joint, and an end joint. If the Effector ReachT value is non-zero (position constraint), both the top and the middle nodes are reoriented so that the chain 302 can fold or unfold to reach the target position. The folding axis for the middle joint is defined by the input FK angle (or by the Characterization Natural Pose if this angle is flat or zero). If the Effector ReachR value is non-zero (orientation constraint), only the end node is reoriented to the desired target orientation. This solving mode is very effective in terms of CPU usage. For example, the TwoBonesIK chain type can be used for a Grasshopper antenna. A parameter: HIKParamTwoBonesIK_FoldingJointIndex provides a zero based index of the folding joint (middle joint) in the joint chain that is declared during characterization. The default value is one.

HIKChainSolvingTypeCoplanar—The solver of embodiments of the invention can solve arbitrary length chains 304. Further, the solver may work better with coplanar appendages (all joints folding on the same plane) (but the solver can also be used for non-coplanar chains 304 as well). For the CoPlanar chain type, users cannot specify Degrees of Freedom (DOF). Certain internal heuristics spread the effort among different joints in the chain 304. The top node is allotted with a high degree of freedom (this is considered similar to a shoulder). Other nodes are able to fold and unfold around an axis defined by the input FK angle (or by the Characterization Natural Pose if that angle is flat or zero). The CPU cost for this solver depends on the chain length (linear relationship). For example, the CoPlanar chain type can be used for a spider leg. No parameters are provided for the CoPlanar chain type.

HIKChainSolvingTypeTentacleApprox—The TentacleApprox chain type is an approximation solver. It does not reach the constraint precisely, but it is efficient in an easy solving configuration where the input FK is close to the IK solution. The TentacleApprox solver can solve arbitrary length chains 304. Unlike the coplanar solver, the TentacleApprox solver can fold joints on any axis to reach the target. The orientation constraint (ReachR value being non-zero) solving is not spread among all joints in the Chain but is directly set to the last joint. The CPU cost for this solver depends on the chain length (linear relationship). For example, the TentacleApprox solver can be used for a Lizard tail. No parameters are provided for the TentacleApprox chain type.

HIKChainSolvingTypeTentacleCCD—The TentacleCCD chain type can be considered as a spine or neck solver (CCD stands for Cyclic Coordinate Descent). It can solve arbitrary length chains 304. The target position and target orientation solving is spread among all declared joints in the chain 304, allowing a smooth and continuous solving. The joints can fold in any direction, and the user can specify a uniform angular limit to ease the curvature. The CPU cost for this solver is high because it is an iterative solver (the iteration count can be defined), and it strongly depends on the chain length. For example, the TentacleCCD chain type can be used for the head or neck of a snake. Parameters for the TentacleCCD solver include an iteration count (with a default value of 32), a degree of freedom (DOF) angle (i.e., a maximum folding angle between two consecutive joints for one iteration, with a default value of 0.157 rad), a degree of freedom mode that defines how the DOFAngle should be spread along the chain (useful for achieving different effects, with a default value of a linear function), and an end orientation influence that specifies where an orientation constraint (ReachR value) must be taken into account from the beginning of the chain (with a default value of 0.5f [50%]).

Step 3: Translating into Code

In steps 1 and 2, the user defines a creature and elects the appropriate chain types for the appropriate features in order to simulate the desired biomechanical behavior. In step 3, the creature diagram (having the associated sections and chain types) are mapped over to a 3D model. Some embodiments of the invention perform such a mapping programmatically while alternative embodiments may utilize a graphical user interface to visually perform the mapping (i.e., from the creature diagram to the 3D model).

1. The first step in the translating is initializing the CREATURE SOLVER with a Creature Definition. The following code shows how such an initialization is performed for a lizard:

```
#define NB_LIZARD_CHAINS 5          // 4 legs and 1 tail
HIKCreatureChainDefinition*lChainDefinitions =
    new HIKCreatureChainDefinition[NB_LIZARD_CHAINS];
lDefinition.mNbChains=NB_LIZARD_CHAINS;
lDefinition.mChains = lChainDefinitions;
HIKCreatureSectionDefinition*lSectionDefinitions = NULL;
lSectionDefinitions=new HIKCreatureSectionDefinition[1];
lDefinition.mNbSections = 1;
lDefinition.mSections = lSectionDefinitions;
```

2. In the second step, the number of joints for each solving chain is set. One does not need to declare all skeleton joints (some skeleton joints may be skipped and users may only declare joints that are important for IK solving). Follows is an example of setting the number of joints:

```
for(int i=0; i<NB_LIZARD_CHAINS; i++)
{
    switch(i)
    {
        case LIZARD_CHAIN_FRONT_LEG_L :
        case LIZARD_CHAIN_FRONT_LEG_R :
            lChainDefinitions[i].mNbNodes = 4; break; // 4 joints for
        the back legs
        case LIZARD_CHAIN_BACK_LEG_L :
        case LIZARD_CHAIN_BACK_LEG_R :
            lChainDefinitions[i].mNbNodes = 3; break; // 3 joints for
        the back legs
        default:
            lChainDefinitions[i].mNbNodes = 6; break; // 6 joints for
        the tail
    }
    lChainDefinitions[i].mSection = 0;             // All Chains are attached
to Section 0
}
```

In the third step of step 3, the section definition is set. After setting the section definition, one can call the HUMANIK API function to create the HIKCreature object from this definition. If utilizing an evaluation copy of the software, a license string may be copied as the last parameter to the following function:

```
lSectionDefinitions[0].mParentChain = −1;
mHIKCreature = HIKCreatureCreate(&lDefinition,
      &malloc, "LicenseHere!!!");
if(mHIKCreature == NULL)
      return false;
```

Before writing more code, the user should try to run the previous code with an application built against a verbose build. This will generate a log file (HUMANIKlog.txt) that can be monitored for errors. CREATURE SOLVER is far more verbose than CHARACTER SOLVER.

4. In the fourth step of step 3, the Creature Characterization pose is specified to HUMANIK. For each declared chain joint and each declared section, the user must provide the solver with a default position, default orientation, and default scale. These transforms must come from a Natural Pose of the user's creature. A Natural Pose is not a T-Stance (T-Stance does not look natural), but a general pose where folding angles for all limbs are explicit (no flat or null angles, and no full extensions). The following code provides an example of the code for the fourth step:

```
HIKCreatureSetCharacterizeNodeStateTQSfv(
      mHIKCreature,
      lLizardProfile->mBoneMapping[i].mChainID,
      lLizardProfile->mBoneMapping[i].mBoneID,
      jointTranslation, jointOrientation, jointScale);
```

Note: The second parameter for this function call is positive when setting chain transforms and negative when setting section transforms. The declaration order of Chains and Sections in the Creature Definition define the IDs (a simple index in an array). The third parameter is only non-zero when dealing with chains. It defines the joint index from the top of the chain that must be set.

5. In the fifth step of step 3, to conclude the initialization sequence, the initial chain solving types as well as other parameters are set (e.g., the Chain Stiffness). Below is an example of setting the chain solving types and other parameters:

```
// Set Chain types
HIKCreatureSetChainSolvingType(mHIKCreature,
LIZARD_CHAIN_TAIL,
      HIKChainSolvingTypeTentacleApprox);
HIKCreatureSetChainSolvingType(mHIKCreature,
LIZARD_CHAIN_FRONT_LEG_L, HIKChainSolvingTypeCoplanar);
HIKCreatureSetChainSolvingType(mHIKCreature,
      LIZARD_CHAIN_FRONT_LEG_R,
HIKChainSolvingTypeCoplanar);
HIKCreatureSetChainSolvingType(mHIKCreature,
      LIZARD_CHAIN_BACK_LEG_L,
      HIKChainSolvingTypeCoplanar);
HIKCreatureSetChainSolvingType(mHIKCreature,
      LIZARD_CHAIN_BACK_LEG_R,
      HIKChainSolvingTypeCoplanar);
// Add stiffness to front leg chains
HIKCreatureSetChainStiffness(mHIKCreature,
      LIZARD_CHAIN_FRONT_LEG_L, 0.75f);
HIKCreatureSetChainStiffness(mHIKCreature,
      LIZARD_CHAIN_FRONT_LEG_R, 0.75f);
```

```
// No stiffness at all for the tail
HIKCreatureSetChainStiffness(mHIKCreature,
      LIZARD_CHAIN_TAIL, 0.0f);
```

The user can decide whether he/she wants the solver to compute FullBodyIK pull and torque. Enabling these features will produce good results, but at some CPU cost. The user can enable or disable pull and torque solving at any time (for example, the user can enable it only when creatures are close enough from the camera) using these functions:

6. Step 6 of step 3 checks the user's log file (HUMANIKlog.txt). If the user communicates invalid transforms during the characterization process, HUMANIK logs a warning or an error in the file.

Step 4: Animating the Creature—The Update Sequence

Once all of the behaviors and mappings have been performed in steps 1-3, step 4 provides for the execution of the solver (e.g., during game play of a game that utilizes the solver). In this regard, users can animate the creature after setting it up properly. Following is the update sequence:

1. Provide the solver with the current FK transforms for all joints (after the engine applies the current FK animation pose). The following function must be called for each chain and section joint:

```
HIKCreatureSetNodeStateTQSfv(mHIKCreature, mHIKInputOutputState,
      lizardProfile->mBoneMapping[i].mChainID, lizardProfile-
      >mBoneMapping[i].mBoneID, translation, orientation, scale);
```

2. Set up the Effectors (position constraints and orientation constraints). The following code shows how to setup a target position for the lizard tail:

```
// synchronize Effectors with current FK transforms
HIKEffectorSetFromCreature(mHIKCreature, mHIKEffectorSetState,
mHIKInputOutputState);
// Get the current Effector position
HIKCreatureGetEffectorStateTQSfv(mHIKEffectorSetState,
TAIL_EFFECTOR, lTranslation, lOrientation, lScale);
// Move the current Effector position (tail position)
lTranslation[0] += cosf(gCurrentTime*2.0f) * 80.0f; lTranslation[1] +=
cosf(gCurrentTime*2.5f) * 150.0f; lTranslation[2] −=
sinf(gCurrentTime*5.0f)
* 40.0f;
// Provide the solver with the new Effector position (position constraint)
HIKCreatureSetEffectorStateTQSfv(mHIKEffectorSetState,
TAIL_EFFECTOR, lTranslation, lOrientation, lScale);
// Enable the position constraint (full reach, no blend with FK)
HIKCreatureSetTranslationActive(mHIKEffectorSetState,
TAIL_EFFECTOR, 1.0f);
// Enable pull, full force
HIKCreatureSetPull(mHIKEffectorSetState, TAIL_EFFECTOR, 0.25f);
```

3. Call the solver:
   HIKCreatureSolveForEffectorSet(mHIKCreature,
      mHIKInputOutputState, mHIKEffectorSetState);

4. Write the solve output transforms back to the game engine. Users must apply the resulting pose on the actual game engine model. For each Chain and Section joint, the following function is called to get its transform:

```
HIKCreatureGetNodeStateTQSfv(mHIKCreature,
      mHIKInputOutputState, lizardProfile-
      >mBoneMapping[i].mChainID, lizardProfile-
      >mBoneMapping[i].mBoneID, translation,
      orientation, scale);
```

Exemplary Samples

Two exemplary samples show how to use the CREATURE SOLVER feature:

1. Creature_mol—This exemplary sample shows how to set up a lizard, a spider, a grasshopper, and a wasp. A user can also enable and disable pull and torque to see how the solver reacts. To switch between creatures, the user needs to recompile the sample after uncommenting the relevant #define in the CreatureApp.h file.

```
// This is the main switch to select the creature the user would like to test
// Only uncomment one of the following lines
#define SPIDER 1
//#define GRASSHOPPER 1
//#define LIZARD 1
//#define WASP 1
```

2. Snake_mol—This exemplary sample illustrates how to setup a snake using several Chains of HIKChainSolvingTypeTentacleCCD type. The sample declines different versions of the snake characterization and creature set up, demonstrating the tradeoff between performance and quality. To check different resolution modes, the user must recompile the sample after uncommenting the relevant #define in the Profile_Snake.h file.

```
// One of the following lines should be uncommented
// This is an easy way to test different solving resolutions
// From the cheapest to the most expensive (CPU)
//#define SNAKE_RESOLUTION_LOW
#define SNAKE_RESOLUTION_NORMAL
//#define SNAKE_RESOLUTION_HIGH
//#define SNAKE_RESOLUTION_EXTREME
```

Software Embodiments—Solver Details

The segmented full body inverse kinematics, hereby referred to as "the solver" is a software component that should be integrated in a real time 3D application (a simulation, a video game, a mobile application, etc.) at two distinct operational phases: application setup and application main loop. This section provides details on these two phases (section 1, section 2) and exposes the details of the actual solving process (section 3).

Section 1: The Solver Setup

The solver setup only happens once during the real time 3D application execution, in the very beginning. A structure describing the high perspective topology of each 3D skeletal model to be operated by the solver should be programmatically built and fetched to the solver during this step. This structure is referred to as the 3D skeletal model "definition". This high level construction plan of the 3D model provides the solver with indications on the different limbs and appendages of the model and their connections.

Figure 6:
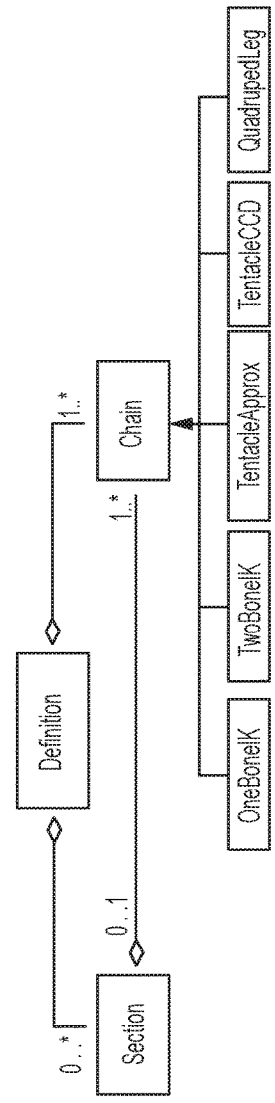
FIG. 6 illustrates a definition of a structure including the definition's sections and chains with different types in accordance with one or more embodiments of the invention.

FIG. 6 illustrates a definition of a structure including the definition's sections and chains with different types in accordance with one or more embodiments of the invention. A definition is made of two distinct object types: chains and sections.

A chain represents a hierarchy of flexible skeleton joints to be operated by the solver, a limb for instance, or an appendage. These joints can represent a spider's leg, a robot's arm or a horse's tail. A chain can be of one of the following types: OneBoneIK, TwoBonesIK, Coplanar, TentacleApprox, TentacleCCD, and QuadrupedLeg. Each of these types implements a different biomechanical model, with various properties and limitations. Embodiments of the invention are not limited to the chain types described herein and types directed towards specific use cases may be utilized. Unlike traditional IK methods requiring tedious individual joints setup, the chain paradigm abstracts the whole IK setup process by introducing a higher level of semantics sparing details to the user, and by allowing a more natural and user friendly way for the user to describe its 3D model and the expected IK behavior. Also, this high level of abstraction approach enables major optimization opportunities during the actual solving process.

A chain can be parented to a section. A section can be parented to a chain; in that case, the chain connecting that section to its parent section is called a section chain (because its purpose is to connect two sections). Chains can be configured with several properties to alter their default biomechanical behavior. For instance, it is possible to configure a chain with a global stiffness, or a resistance to compression factor. All these configuration properties will get applied by the solver during the actual solving process (see section 2 below).

A section represents a connection point for different chains. For instance, on a human, the chest can be considered as a section as this is where the arms and the neck meet, from a high level point of view. Unlike fixed IK rig based solutions, the solver of embodiments of the invention enables a variable number of chains per section. This enables the solving of any sort of living creatures, for instances, like insects with six legs and antennae, tripods, etc. Implicitly, pulling on a chain should (recursively) engage its parent section(s) during the actual solving process (see section 2). A section can be thought as a hub for energy transfer through the model. There are two types of sections: root sections and children sections. There can only be one root section for a 3D skeletal model, and this root section has no parent. The root section is the most important section as all other sections and chains depend on that section.

Children sections are parented to chains, themselves parented to another child section or directly to the root section. Sections can be configured with several properties describing how energy propagates through them during the actual solving process (see section 2).

The relationship between solver definition objects (chains and sections) and the underlying 3D skeletal model joints they represent is flexible and allow partial/incomplete mappings. It is possible for the solver, for instance, to only operate on a horse's tail, and to ignore the rest of the horse's body. Or to only operate on one of the legs, and not necessarily on all joints of the underlying 3D skeletal model (intermediary joints can be ignored when they are not expected to contribute to the actual solving). A section always maps to a single joint in the 3D skeletal model. A chain maps to 1 to N joints in the skeletal model.

During the solver setup, the number of actual joints for each chain should be communicated to the solver, so that the solver allocates the internal data structures to operate on that chain. Parent offsets information (when intermediary joints are ignored) and individual joints DOFs can also be specified during this setup step, optionally. FIGS. 7A and 7B illustrate one way of mapping the 3D skeletal model of a horse in accordance with one or more embodiments of the invention. FIG. 7A illustrates a 3D skeletal model of a horse (with the lines 702 inside the horse's outline representing joints) and FIG. 7B illustrates a valid model definition of the horse with 7 chains 704 (4 legs, spine, neck, and tail), and 2 sections 706 [hip/root, chest/child]).

When the user communicates the definition to the solver, the solver creates a collection of structures that will be used for fetching data during the solver main loop (section 2) and to facilitate user control over the solving. This process of creating these structures is called "characterization". During the characterization process, the user definition gets checked for errors and consistency. These structures are called "HIKCreature", "HIKCreatureState" and "HIKCreatureEffectorSet". FIG. 8 illustrates examples of these three exemplary structures created by the solver during the setup phase in accordance with one or more embodiments of the invention.

The HIKCreature structure stores most of the data the user communicates through its definition (sections count, chains count, number of joints for each chains, chains properties, parent offsets, individual joints degree of freedom information, etc.).

The HIKCreatureState allocates memory for the user to provide forward kinematics joints coordinates as an input during the solving process (see section 2) and to retrieve the inverse kinematics joints coordinates as an output of that solving process. Coordinates in HIKCreatureState are expressed in TQS format (Translation (x, y, z), orientation (Quaternion), Scale (x, y, z)).

The HIKCreatureEffectorSet allocates memory for the user to provide inverse kinematics constraints as an input during the solving process. One effector (and only one) is created for each section and each chain. An effector represents a target position and a target orientation to get fully or partially reached by the solver during the solving process depending on the user settings.

During the characterization process, the user should also communicate a reference pose for its model. The reference pose is a collection of transforms (TQS) representing the model in a normal stance, i.e. with the legs/appendages neither in over-flexion nor in over-extension. The solver uses this stance as a calibration stance.

Section 2: The Solver Main Loop

Real time 3D applications (simulations, video games, etc.) operate in discrete time instead of continuous time, and animation clips as authored by artists or as produced by motion capture devices can be thought as a series of forward kinematics frames representing the animated 3D model in different intermediary postures slightly varying over time. An animation engine, responsible for playing back recorded motion, is usually called 30 to 100 times per second (30 Hz to 100 Hz) for the user to get a good sense of motion. This repetitive pattern is usually referred as an "update loop" and occurs for each "frame". The solver should be called each frame to operate on a 3D skeletal pose and modify it.

Figure 9:
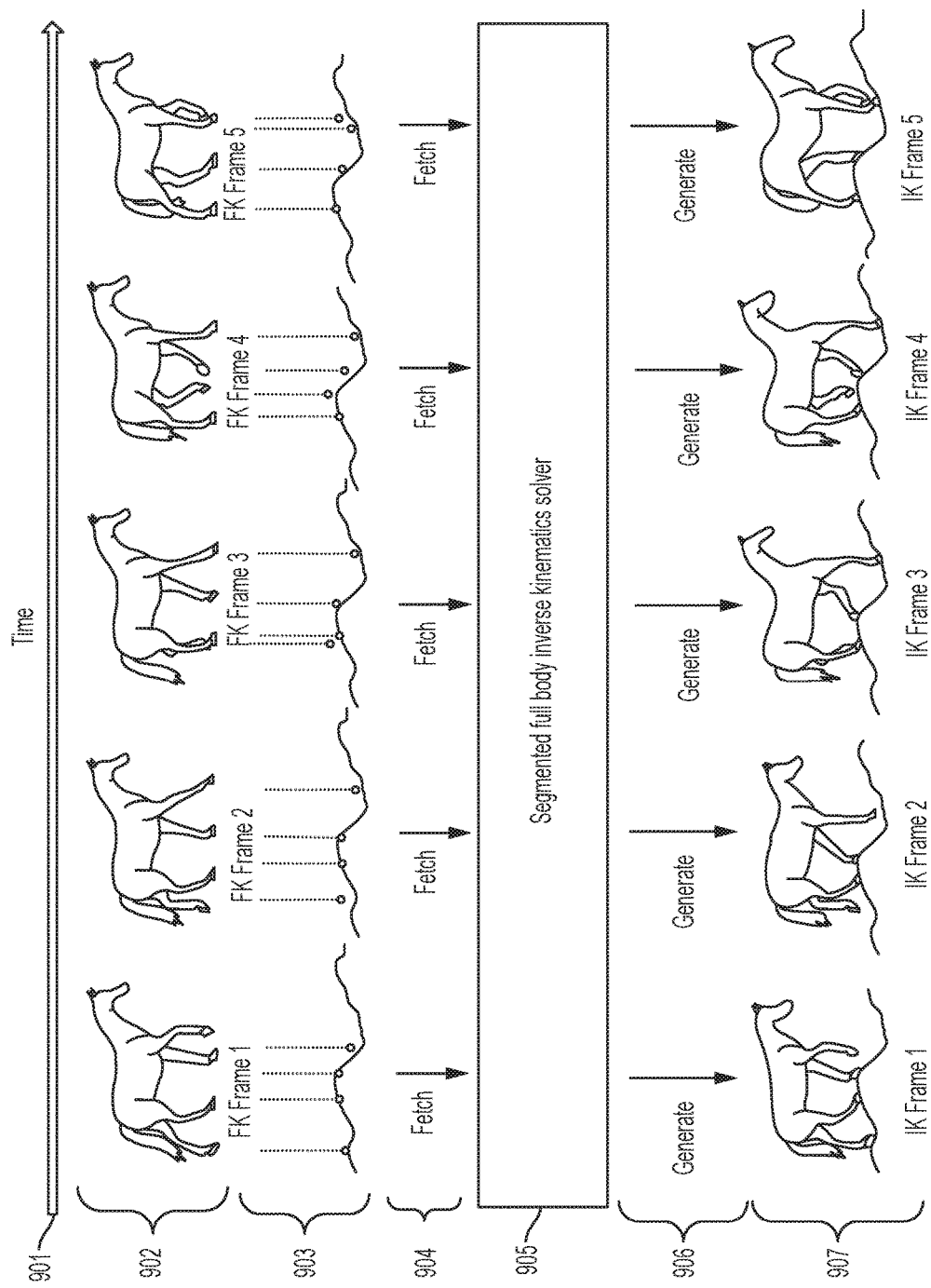
FIG. 9 illustrates the adapting of a horse walk animation to uneven terrain in accordance with one or more embodiments of the invention.

FIG. 9 illustrates the adapting of a horse walk animation to uneven terrain in accordance with one or more embodiments of the invention. The solver is used to adapt a horse walk cycle (FIG. 9, 902) (over time 901) to fulfill a set of constraints maintaining the relative altitude of each hoof over an uneven ground (FIG. 9, 903). The solver fetches both the forward kinematics frames and the constraints (FIG. 9, 904), performs its internal inverse kinematics computation 905 (see next section for details) and generates 906 an output inverse kinematics pose 907 matching all constraints while guaranteeing biomechanical consistency and motion continuity.

The added value of embodiments of the invention is obviously demonstrated here as animation clips production is expensive, takes time and requires expertise. Instead of authoring/capturing a series of motion clips corresponding to various terrain topologies, the user can focus his/her efforts on authoring/capturing a single canonical motion clip matching a neutral (flat) terrain (i.e., pose 902) that gets adapted live during the "update loop" on its 3D model by the solver.

Section 3. Solving Details

This section describes the actual solving process as introduced in (FIG. 9, 905) and explains how the solver generates an output pose 907 (IK frame) from an FK pose 902 and a set of constraints with their respective properties.

The actual solving is both an iterative and recursive process. The reason for that is the geometric complexity of the solving is so high that no analytic method can be used; a method should be used that generates a sequence of improving approximate solutions for the current set of inputs (FK pose 902, constraints, properties).

The iterative aspects, that can be configured by the user (user can set the number of general iterations and the number of per-section iterations), enable low precision (performance oriented) or high precision (quality oriented) solving. It is up to the user to decide for the right tradeoff, depending on the application context (a real time application [e.g., a video game, a military simulation, etc.] usually requires high performances while a digital content creation tool usage requires high precision, high quality solving).

Figure 10:
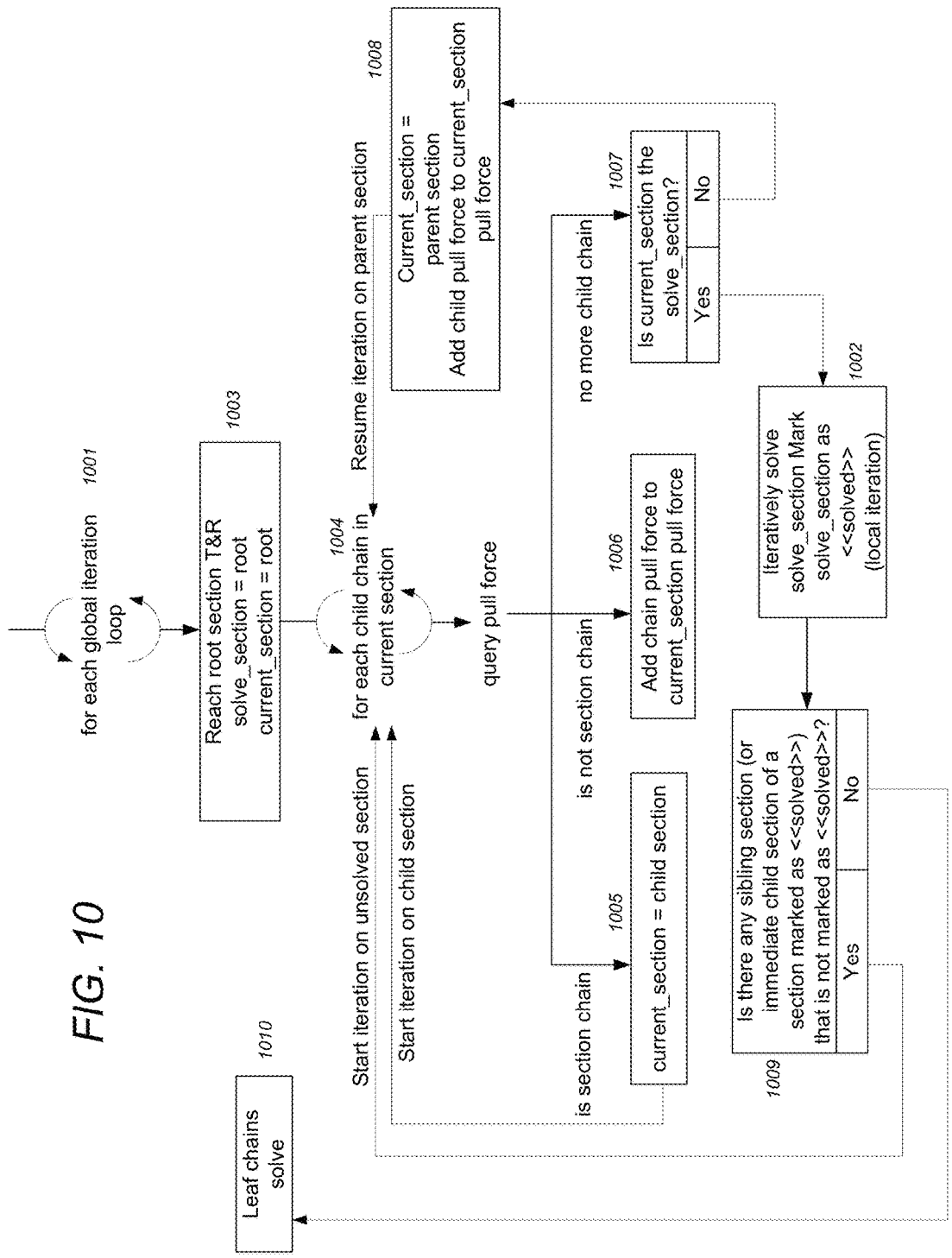
FIG. 10 is a flow chart illustrating the solving sequence in accordance with one or more embodiments of the invention.

Two types of iterations should be distinguished. FIG. 10 is a flow chart illustrating the solving sequence in accordance with one or more embodiments of the invention. The first type of iteration is the global iteration (FIG. 10, 1001), which enables repetition of the whole solving sequence described below to converge to a higher precision solution (each iteration leads to a more accurate posture). The secondary iterations (local iterations [FIG. 10, 1004]) are per-section iterations evaluated during the solving process (once for each section); section's relative transforms (positions, orientations) are fine-tuned at that point to properly react to all forces pulling on them.

The recursive aspects, that are not configurable (the section tree is always evaluated in the same order), enables energy transfer between sections through section chains. The solving starts from the root section that is considered as the most important section (FIG. 10, 1003), as any change on the root section impacts the whole 3D model. The solving priority of a child section (how much it prevails during the solving process when constraints do not converge) is always lower than the solving priority of its parent section. Although a child section can affect the solving of its parent section (by pulling on it), this effect gets applied during the parent's section local iteration (FIG. 10, 1002); not during the child section local iteration (FIG. 10, 1004).

Starting from the root section 1003 and recurring into all branches (depth first), a pull vector is computed for each section by adding all pull forces of the chains connected to that section (FIG. 10, 1005, 1006). This pull vector indicates how much a section needs to drift and rotate to reach all of its direct and indirect constraints. This pull vector is recursively returned to the parent section (FIG. 10, 1007 and 1008). When the pull vector is fully determined for a section, a local iteration happens that progressively reorients and translates the section to a more appropriate state where all constraints get satisfied (FIG. 10, 1002). The section is now marked as "solved" for this global iteration loop and won't move anymore. Siblings and children sections get evaluated (FIG. 10, 1004) following the same pattern until all sections are marked as "solved" (FIG. 10, 1009). When all sections are marked as "solved", all non-section chains of the model get individually evaluated to reach their respective constraints (FIG. 10, 1010). The model converges to a pose that is close to an acceptable solution that can be refined through the global iteration.

Logical Flow

Figure 11:
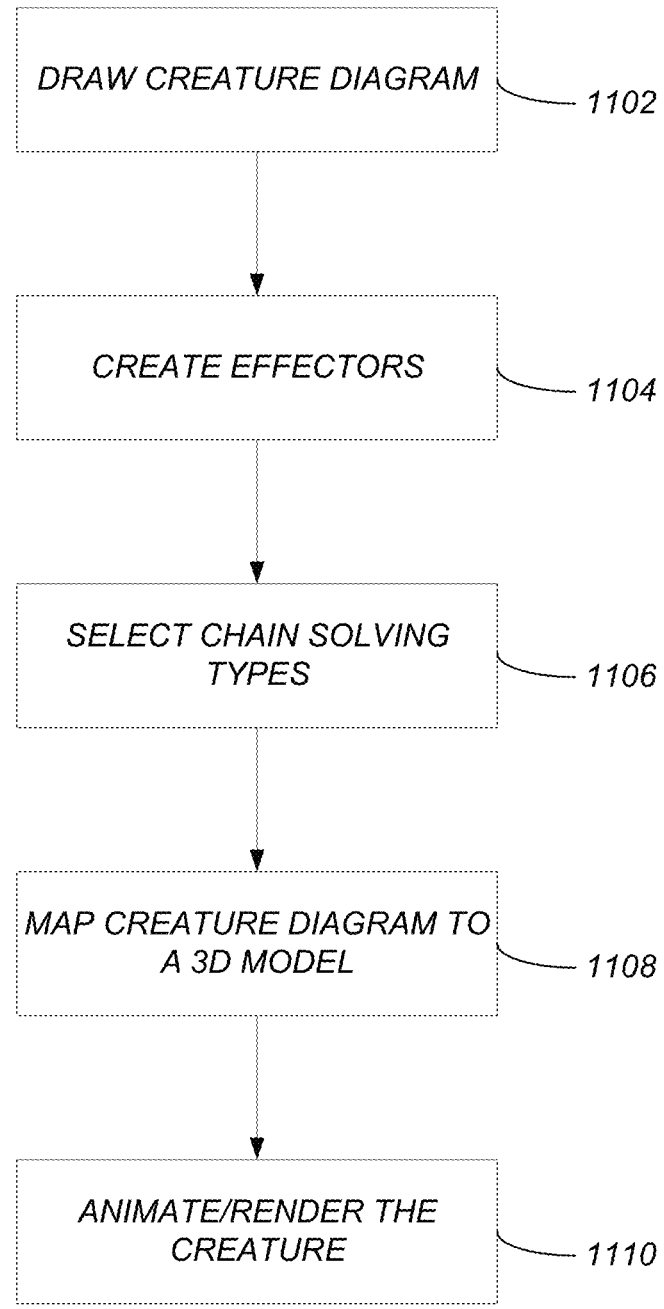
FIG. 11 illustrates the logical flow for rendering an animated creature in real-time in accordance with one or more embodiments of the invention.

FIG. 11 illustrates the logical flow for rendering an animated creature in real-time in accordance with one or more embodiments of the invention.

At step 1102, a creature diagram is drawn for a creature. The creature diagram includes one or more chains and one or more sections. Each of the one or more chains may consist of a limb or a link between two sections. Further, each of the one or more chains may consist of a hierarchy of flexible skeleton joints. Each of the one or more sections consists of a central body part for the creature, and/or may serve as a connection point for different chains.

At step 1104, an effector is created for each of the one or more sections and each of the one or more chains (e.g., automatically without additional user input). Each effector defines a target position and an orientation that is reached.

At step 1106, a chain solving type, of one or more chain solving types, is selected for one or more of the one or more chains. The selected chain solving type is used to simulate a desired biomechanical behavior of the creature. As described above, five exemplary chain solving types may be provided (although the invention is not limited to these five examples).

In a first example, the chain solving type may be a one bone inverse kinematic chain type. In the first exemplary type, a first joint is located at one end of the chain, a second joint is located at an opposite end of the chain, and an orientation of the first joint and the second joint is based on a position constraint of the effector of the chain.

In a second example, the chain solving type may be a two bones inverse kinematic chain type. In the second example, a first joint is located at a top of the chain, a second joint is located at a middle of the chain, a third joint is located at an end of the chain, and a position constraint of the effector of the chain determines orientations of the top joint, the middle joint, and the end joint such that the chain can fold or unfold to reach a target position.

In a third example, the chain solving type may be a coplanar inverse kinematic chain type. In the third example, a first joint is located at a top of the chain, the first joint has a specified degree of freedom, and additional joints fold and unfold around an axis defined by an input angle.

In a fourth example, the chain solving type may be a tentacle approximation inverse kinematic chain type where joints of the chain can fold on any axis to reach a target.

In a fifth example, the chain solving type may be a tentacle CCD inverse kinematic chain type. In the fifth example, joints of the chain can fold in any direction, a uniform angular limit eases a curvature of the chain, and the tentacle CCD inverse kinematic chain type is an iterative solver.

At step 1108, the creature diagram, including the one or more sections and one or more chains and chain solving types, is mapped to a three-dimensional (3D) model. The mapping step 1108 may include various sub-steps. In a first sub-step, a creature solver is initialized with a creature definition (the creature definition names the creature and sets a chain number of the chains and a section number of the sections). In a second sub-step, a joint number of joints for the chains is set. In a third sub-step, a section definition of the one or more sections is set. In a fourth sub-step, a reference pose for the creature is specified. Such a reference pose may provide a default position, a default orientation, and a default scale for each of the joints and sections. In a fifth sub-step, the selected chain solving type is set.

At step 1110, the creature in animated/rendered in a real-time 3D application based on the mapping. The animating may provide transforms, for all joints of the sections and chains, to a solver. Thereafter, position constraints and orientation constraints for each effector may be set up. The solver, executes, for each frame of the real-time 3D application, to produce output transforms. The output transforms are then written/output to the real-time 3D application that applies the transform to the creature in real-time to render the creature.

In addition, the solver may begin on a root section and recur into child sections of the root section. The solver computes a pull vector for each section by adding pull forces of the chains connected to that section, and recursively returns the pull vector to a parent section. When the pull vector is fully determined for a section, the solver performs secondary iterations that progressively reorients and translates the section to a state where constraints are satisfied and the transforms for the section are tuned to properly react to any forces pulling on that section. Further, when all sections have constraints that are satisfied, the solver may perform a global iteration to converge to a higher precision solution of a posture of the creature.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for rendering an animated creature in real-time, comprising:
  drawing a creature diagram for a creature, wherein the creature diagram comprises one or more chains and one or more sections;
  creating an effector for each of the one or more sections and each of the one or more chains, wherein each effector defines a target position and an orientation that is reached;
  selecting a chain solving type, of one or more chain solving types, for one or more of the one or more chains, wherein the selected chain solving type is used to simulate a desired biomechanical behavior of the creature;
  mapping the creature diagram, including the one or more sections and one or more chains and chain solving types, to a three-dimensional (3D) model; and
  animating the creature in a real-time 3D application based on the mapping, wherein the animating comprises:
    providing transforms, for all joints of the one or more sections and one or more chains, to a solver;

setting up position constrains and orientation constraints for each effector;
executing the solver, for each frame of the real-time 3D application, to produce output transforms; and
writing the output transforms to the real-time 3D application that applies the transform to the creature in real-time to render the creature.

2. The computer-implemented method of claim 1, wherein each of the one or more chains comprises a limb or a link between two sections.

3. The computer-implemented method of claim 1, wherein each of the one or more chains comprises a hierarchy of flexible skeleton joints.

4. The computer-implemented method of claim 1, wherein each of the one or more sections comprises a central body part for the creature.

5. The computer-implemented method of claim 1, wherein each of the one or more sections comprises a connection point for different chains.

6. The computer-implemented method of claim 1, wherein the creating the effector is performed automatically without additional user input.

7. The computer-implemented method of claim 1, wherein the chain solving type for one of the one or more chains comprises a one bone inverse kinematic chain type wherein:
   a first joint is located at one end of the chain;
   a second joint is located at an opposite end of the chain; and
   an orientation of the first joint and the second joint is based on a position constraint of the effector of the chain.

8. The computer-implemented method of claim 1, wherein the chain solving type for one of the one or more chains comprises a two bones inverse kinematic chain type wherein:
   a first joint is located at a top of the chain;
   a second joint is located at a middle of the chain;
   a third joint is located at an end of the chain; and
   a position constraint of the effector of the chain determines orientations of the top joint, the middle joint, and the end joint such that the chain can fold or unfold to reach a target position.

9. The computer-implemented method of claim 1, wherein the chain solving type for one of the one or more chains comprises a coplanar inverse kinematic chain type wherein:
   a first joint is located at a top of the chain;
   the first joint has a specified degree of freedom; and
   additional joints fold and unfold around an axis defined by an input angle.

10. The computer-implemented method of claim 1, wherein the chain solving type for one of the one or more chains comprises a tentacle approximation inverse kinematic chain type wherein:
   joints of the chain can fold on any axis to reach a target.

11. The computer-implemented method of claim 1, wherein the chain solving type for one of the one or more chains comprises tentacle cyclic coordinate descent (CCD) inverse kinematic chain type wherein:
   joints of the chain can fold in any direction;
   a uniform angular limit eases a curvature of the chain; and
   the tentacle CCD inverse kinematic chain type comprises an iterative solver.

12. The computer-implemented method of claim 1, wherein the mapping comprises:
   initializing a creature solver with a creature definition, wherein the creature definition names the creature and sets a chain number of the one or more chains and a section number of the one or more sections;
   setting a joint number of joints for one or more of the one or more chains;
   setting a section definition of the one or more sections;
   specifying a reference pose for the creature, wherein the reference pose comprises a default position, a default orientation, and a default scale for each of the one or more joints and the one or more sections; and
   setting the selected chain solving type.

13. The computer-implemented method of claim 1, wherein the solver:
   begins on a root section of the one or more sections and recurs into child sections of the root section;
   computes a pull vector for each section by adding pull forces of the one or more chains connected to that section, and recursively returns the pull vector to a parent section;
   when the pull vector is fully determined for a section, performs secondary iterations that progressively reorients and translates the section to a state where constraints are satisfied and the transforms for the section are tuned to properly react to any forces pulling on that section; and
   when all sections have constraints that are satisfied, performs a global iteration to converge to a higher precision solution of a posture of the creature.

14. A system for rendering an animated creature in real-time, comprising:
   a computer having a processor;
   a drawing application executed by the processor, wherein a creature diagram for a creature is drawn on the drawing application, and wherein the creature diagram comprises one or more chains and one or more sections;
   a solver executed by the processor, wherein the solver:
      creates an effector for each of the one or more sections and each of the one or more chains, wherein each effector defines a target position and an orientation that is reached;
      selects a chain solving type, of one or more chain solving types, for one or more of the one or more chains, wherein the selected chain solving type is used to simulate a desired biomechanical behavior of the creature; and
      maps the creature diagram, including the one or more sections and one or more chains and chain solving types, to a three-dimensional (3D) model; and
   a real-time 3D application executed by the processor, wherein the real-time 3D application animates the creature based on the mapping, and wherein the real-time 3D application animates the creature by:
      providing transforms, for all joints of the one or more sections and one or more chains, to a solver;
      setting up position constrains and orientation constraints for each effector;
      executing the solver, for each frame of the real-time 3D application, to produce output transforms; and
      writing the output transforms to the real-time 3D application that applies the transform to the creature in real-time to render the creature.

15. The system of claim 14, wherein each of the one or more chains comprises a limb or a link between two sections.

16. The system of claim 14, wherein each of the one or more sections comprises a connection point for different chains.

17. The system of claim 14, wherein the chain solving type for one of the one or more chains comprises a one bone inverse kinematic chain type wherein:
- a first joint is located at one end of the chain;
- a second joint is located at an opposite end of the chain; and
- an orientation of the first joint and the second joint is based on a position constraint of the effector of the chain.

18. The system of claim 14, wherein the chain solving type for one of the one or more chains comprises a two bones inverse kinematic chain type wherein:
- a first joint is located at a top of the chain;
- a second joint is located at a middle of the chain;
- a third joint is located at an end of the chain; and
- a position constraint of the effector of the chain determines orientations of the top joint, the middle joint, and the end joint such that the chain can fold or unfold to reach a target position.

19. The system of claim 14, wherein the chain solving type for one of the one or more chains comprises a coplanar inverse kinematic chain type wherein:
- a first joint is located at a top of the chain;
- the first joint has a specified degree of freedom; and
- additional joints fold and unfold around an axis defined by an input angle.

20. The system of claim 14, wherein the chain solving type for one of the one or more chains comprises a tentacle approximation inverse kinematic chain type wherein:
- joints of the chain can fold on any axis to reach a target.

21. The system of claim 14, wherein the chain solving type for one of the one or more chains comprises tentacle cyclic coordinate descent (CCD) inverse kinematic chain type wherein:
- joints of the chain can fold in any direction;
- a uniform angular limit eases a curvature of the chain; and
- the tentacle CCD inverse kinematic chain type comprises an iterative solver.

22. The system of claim 14, wherein the solver maps by:
- initializing the solver with a creature definition, wherein the creature definition names the creature and sets a chain number of the one or more chains and a section number of the one or more sections;
- setting a joint number of joints for one or more of the one or more chains;
- setting a section definition of the one or more sections;
- specifying a reference pose for the creature, wherein the reference pose comprises a default position, a default orientation, and a default scale for each of the one or more joints and the one or more sections; and
- setting the selected chain solving type.

23. The system of claim 14, wherein the solver:
- begins on a root section of the one or more sections and recurs into child sections of the root section;
- computes a pull vector for each section by adding pull forces of the one or more chains connected to that section, and recursively returns the pull vector to a parent section;
- when the pull vector is fully determined for a section, performs secondary iterations that progressively reorients and translates the section to a state where constraints are satisfied and the transforms for the section are tuned to properly react to any forces pulling on that section; and
- when all sections have constraints that are satisfied, performs a global iteration to converge to a higher precision solution of a posture of the creature.

* * * * *